April 20, 1948.  W. C. MARSHALL  2,439,942
MOVABLE ELECTRODE TUBE
Filed Nov. 20, 1944  2 Sheets-Sheet 1
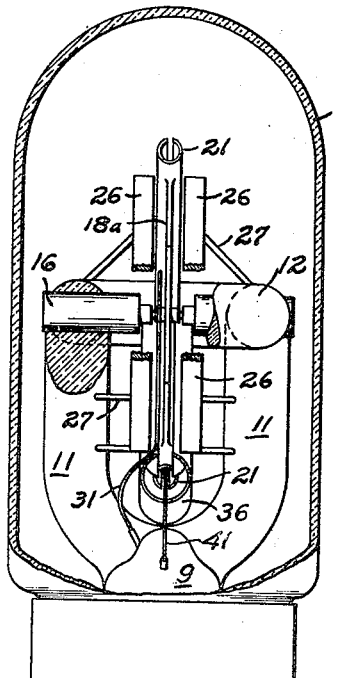
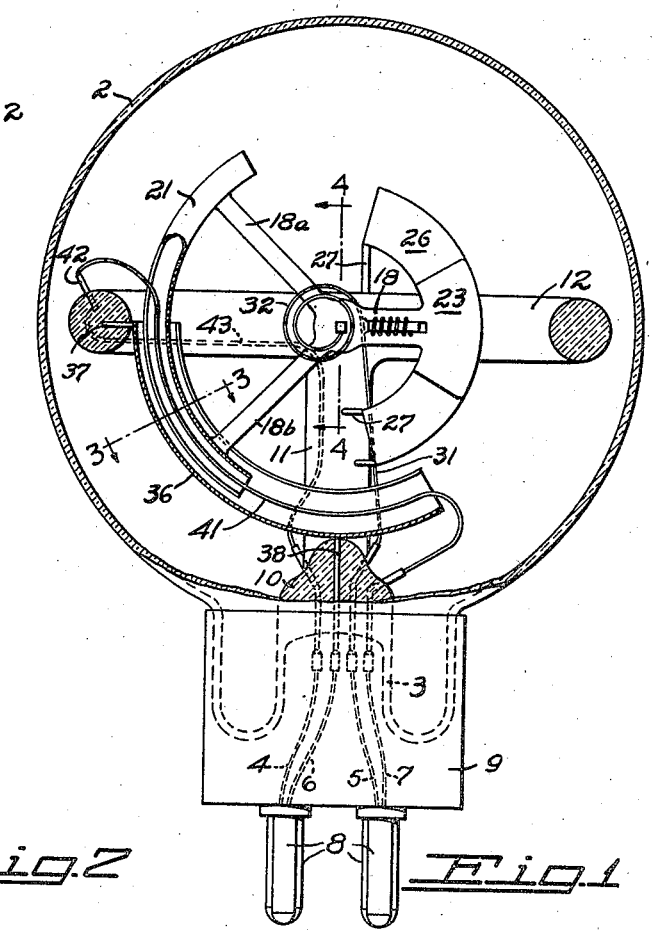
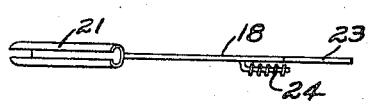
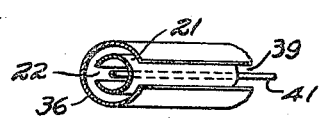
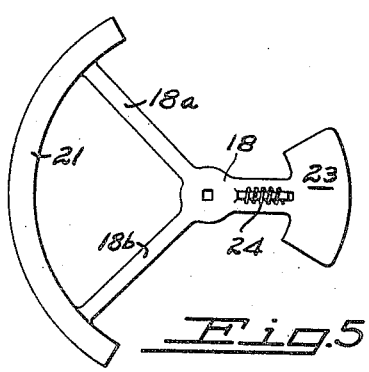
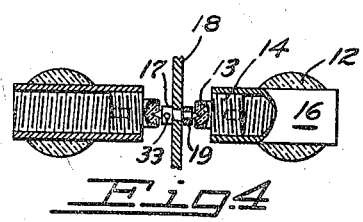
INVENTOR
William C. Marshall
BY Charles S. Evans
HIS ATTORNEY April 20, 1948. W. C. MARSHALL 2,439,942
MOVABLE ELECTRODE TUBE
Filed Nov. 20, 1944 2 Sheets-Sheet 2

INVENTOR
William C. Marshall
BY
Charles S. Evans
his ATTORNEY

Patented Apr. 20, 1948

2,439,942

UNITED STATES PATENT OFFICE 2,439,942

MOVABLE ELECTRODE TUBE

William C. Marshall, Oakland, Calif.

Application November 20, 1944, Serial No. 564,302

9 Claims. (Cl. 250—27.5)

My invention relates to electronic tubes; and the broad object of my invention is the provision of a tube having a movable electrode for varying the characteristics of the output current, so that such variation in current may be used to evaluate on a dial the degree of such movement; and if desired, for use through suitable auxiliary devices to control the operation of corrective, compensative mechanisms.

Another object is the provision of a tube of the character described in which movement of one of the electrodes and resulting variation in anode voltage is automatically responsive to change of position of the tube.

One of the specific objectives of my invention is to provide means to serve in aircraft as a basic reference for accurate indication and control of level flight attitude.

Another object of the invention particularly applicable to aircraft, is the provision of basic reference means including an electronic tube which is continuously operative after closing a control switch, and which immediately supplies a positive and accurate indication of any pitching or rolling movement of the aircraft.

Still other objects include the provision of such means having the important qualities of low initial cost, low installation and maintenance costs, light weight with absence of heavy high speed rotary parts, and with increased simplicity, dependability and accuracy.

My invention possesses other objects and features of value, some of which with the foregoing will be set forth in the following description of the invention. It is to be understood that I do not limit myself to the showing made by the said description and the drawings as I may adopt variant forms of the invention within the scope of the appended claims.

Referring to the drawings:

Figure 1 is a front or broadside elevation of a tube embodying my invention; and Figure 2 is a side elevation thereof. In both views parts are shown in section.

Figure 3 is a cross section on an enlarged scale through the three electrodes, the plane of section being indicated by the line 3—3 of Figure 1.

Figure 4 is a detail on an enlarged scale of the grid frame journal. The view is partly in vertical section, the plane of section passing through the axis of the bearing, as indicated by the line 4—4 of Figure 1.

Figure 5 is an elevation on an enlarged scale of the grid and grid supporting frame and counterbalance; and Figure 6 is a top view of the same.

Figure 8:
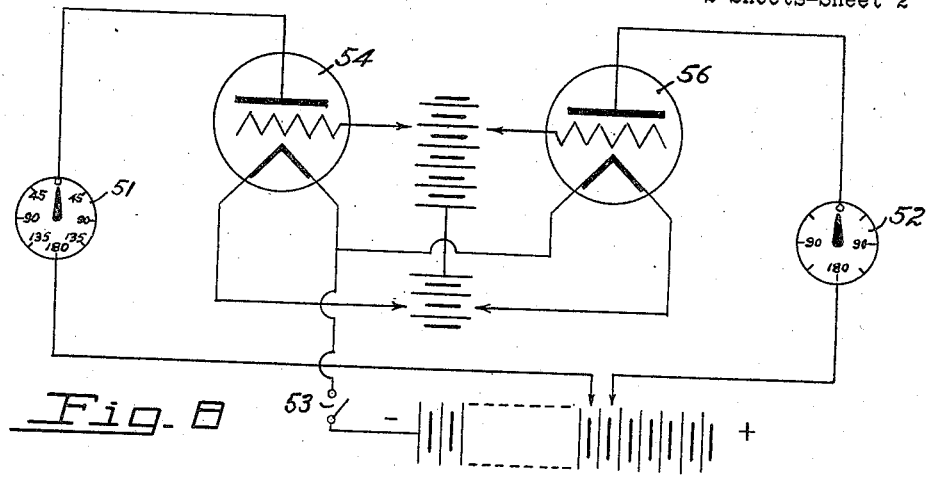
Figure 8 is a wiring diagram of the connections for two tubes in a system for showing pitch and roll of an aircraft about its lateral and longitudinal axes respectively.

In terms of broad inclusion my invention comprises an electronic tube enclosing a frame or chassis upon which are arranged preferably three basic electrodes, cathode, grid and anode. Two of these, preferably cathode and anode, are disposed on the chassis in a fixed arc having a common center; and the grid is pivotally mounted for movement about the same center so that the arc of coincidence, that is, the degree of lapping of the grid over the cathode and anode, varies with movement of the grid about its pivotal axis. Each of the electrodes extends preferably through about 120° of arc, and by balancing the grid in such a position that when the tube's long axis is vertical, the grid laps the other two electrodes by 60°, then a mere tipping of the tube to one side or the other or relative to its long axis, varies the arc of coincidence between the electrodes. By supplying a fixed potential to the cathode and grid, any change in the length of the arc of coincidence between these electrodes and the anode results in a corresponding change in anode current. Such current variations are readily used to operate indicia evaluating the change or through relays to control other circuits.

Because my tube thus responds to a tipping movement by varying the electrical characteristics of the anode output current, it becomes possible to arrange two such tubes with the grid axes at right angles to each other and parallel respectively to the horizontal and lateral axes of an airplane, so that roll and pitch movements of the plane may be instantly indicated on a calibrated dial. Such a pair of tubes may also be used through relays operated by anode current variations to manage circuits which actuate automatic flight control means.

Thus a pair of my tubes provides a basic reference for the accurate indication and automatic control of aircraft attitude with relation to level flight. Many other applications may be made of one or more of my tubes. By mounting a single tube on a pivoted float arm, the level of water in a reservoir may be constantly shown on a dial calibrated in feet and located in a power house miles away. By mounting a tube on a pivoted arm extending into a flowing stream, the velocity and volume of the flow may be evaluated, or circuits managed for the operation and control of mechanisms to be correlated to variations in such flow.

In detail and referring first to Figure 1, my movable electrode tube comprises a flattened but generally globular envelope 2, conveniently made of glass, and vacuumized in a manner well known in this art. For convenience in mounting and making connections, the envelope is provided with a stem 3 through which are sealed electrical conductors 4, 5, 6 and 7, connecting the prongs 8 on the lower end of the stem to their corresponding electrodes within the vacuumized envelope. The stem is surrounded by and embedded in the usual protective base cap 9.

For convenience in description the tube will be assumed to be arranged for operation in a vertical position as shown in Figure 1, with its longitudinal vertical axis passing centrally through the stem and envelope. Extending upwardly from each side of the press 10 of the stem is a glass arm 11. The two arms form a yoke and at their upper ends merge symmetrically into opposite sides of the elongated glass ring 12, which lies in a horizontal plane perpendicular to the vertical axis of the envelope. Within and upon this glass frame or chassis, the operating parts of my device are mounted.

The preferred embodiment of my invention here selected for explanation includes three electrodes, cathode, anode and grid, of which one, preferably the grid is mounted for movement relative to the other two. Fixed on opposite sides of the chassis ring are pivot bearings, each formed by a sapphire bearing block 13 carried on the end of a threaded plug 14, adjustable in a threaded sleeve 16, moulded into the body of the ring 12.

Journaled in the pivot bearings is a shaft 17 having at its center a square hub on which the grid supporting frame 18 is fixedly held by a collar 19 pressed on the reduced end of the shaft. The grid supporting frame bifurcates at one end into the arms 18a and 18b, to the ends of which a split tubular grid 21 is fixed. Preferably the grid is made of a nickel wire mesh; and extends over an arc of about 120° centered in the axis of the grid supporting frame pivot bearings. Preferably the grid has a C-shape section when viewed in a radial plane (Figure 3), the split or gap 22 being on the side opposite to the pivotal axis of the grid frame.

Means are provided for balancing the grid and its supporting frame in a position in which it is symmetrical with respect to a horizontal plane through the pivotal axis of the grid. Fixed on the end of the frame (right hand end Figure 1) is a counterbalancing vane 23 preferably integral with the grid supporting frame and formed with it from sheet aluminum. The size of the vane is calculated with reference to the dimensions and weight of the grid and supporting frame to effect the balance referred to but small adjustment is provided for by a small coil 24 of wire resiliently held on an arm stamped out of the body of the frame as best shown in Figures 5 and 6.

The vane 23 also has the function of damping sudden vibratory movements of the grid and frame. This is accomplished by mounting the vane between two permanent magnets 26 arranged with opposite poles adjacent, and fixedly supported on the chassis by arms 27 embedded in the chassis yoke and ring. With operation of the device, the vane therefore moves across the magnetic field, but minor oscillations are arrested or damped by the eddy currents set up in the vane as it cuts across the flux. In an airplane, gyroscopic forces and also the influence of momentum and inertia tend to disturb the level position of the grid frame, and the stabilizing or damping of these movements is especially necessary in such use; although in some other applications of my tube such damping function may seldom if ever occur.

Means are provided for electrically connecting one of the leads 8 to the grid; and this is preferably done by welding or otherwise connecting to the inner terminal of conductor 5, the steel spring 31, which extends upwardly in the tube to a flat spiral coil 32, the end of which is fixed in a hole 33, formed in the shaft 17. In addition to being the conductor which carries the grid current, this spring also contributes a stabilizing or smoothing effect on the movements of the grid during operation of the tube. Although its tortional stress on the grid shaft is extremely small, it tends to prevent too sudden or sensitive response to movement of the tube out of the vertical axis. It also tends to damp response to vibratory motion of the tube.

The anode 36 of my tube is also a split tubular structure, preferably but not necessarily, made of tantalum and fixed to the post 37 in the horizontal ring and post 38 in the press, the latter being continuous with the conductor 6 sealed in the stem. As best shown in Figure 3, the shape of the anode 36, like that of the grid 21, is that of a C. Since the anode is fixed in the chassis, which in operation of the tube may tip to one side or the other, and since the grid is balanced to remain in level position, the penetration of the curved tubular grid into the tubular anode will vary widely. The anode is therefore curved in an arc having the same center as the arc of the grid; that is, the axis of the shaft 17. The gap or split 39 is placed on the inside to provide a freeway for the arms 18a and 18b of the grid frame; and the parts are arranged as shown in Figure 1, so that in normal level setting, the grid tube is centered in the anode tube radially; and circumferentially, about half of the grid tube extends into the anode tube, and the remainder of the grid tube extends above the upper end of the anode tube. In the position of level setting then, the arc of coincidence is conveniently 60° with a range in operation from 0° to 120° of coincidence. It is obvious that by changing the length of the electrodes the arc of coincidence at level setting could be increased up to 90°, with a range from 0° to 180°.

Connected to the conductors 4 and 7 in the stem, is the cathode 41, preferably but not necessarily formed of a platinum or nickel alloy, and coated with an oxide of barium or strontium. The cathode enters the lower end of the tubular anode and extends upwardly therein and in the tubular grid, along the curved center line common to both, to emerge through the freeway in the grid provided by the gap therein, and at the upper end of the anode where it is secured to the post 42 set in the chassis ring. The post is connected by the conductor 43 disposed in or on the chassis to the conductor 4 in the stem.

Figure 7:
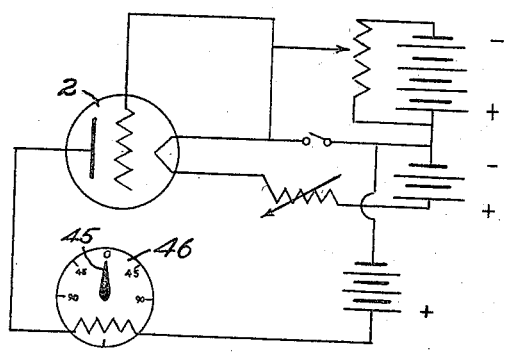
Figure 7 is a wiring diagram showing one of my tubes connected for operating an indicator dial.

Figure 7 is a wiring diagram showing one of my tubes connected to indicate any deviation of its central longitudinal axis from the vertical. For simplicity in explanation, the plane in which deviating movement occurs will be assumed to be vertical and perpendicular to the axis of the grid shaft. It will be assumed also that the tube is so mounted on the structure with which it is to be used that with the longitudinal axis of the tube in a vertical position, the grid structure is level, with about one-half the grid lapping the anode and cathode. In this position of the parts, the carrying structure is in the position of normal operation, and the current flow in the several circuits when placed in operation are so adjusted that the indicator 45 on the dial 46 is at zero.

If from this normal or level position, the tube is tipped to move its longitudinal axis out of the vertical position, the grid and grid supporting frame tend to remain in the balanced or level position, varying the arc of coincidence between the grid, and the cathode and anode which move together with the chassis, and varying in a proportionate degree the anode output current. This current can be accurately measured by a suitable metering device having the dial 46 calibrated in degrees each way from 0, which represents level position, so that tipping of the tube to the right or left is reflected immediately in corresponding movement of the indicator 45. Quite obviously, the anode circuit may be also connected to a relay controlling a switch in the control circuit of mechanisms, the operation of which is related to the position of the tube and which are to be automatically managed by it; as for example, the moving of a valve in a penstock when a change in water level makes it desirable to vary the volume delivered to the wheels. Such relay controlled switches are well known and therefore need no detailed explanation here.

In Figure 8 is shown the wiring diagram and general arrangement by which two of my tubes may be utilized to give accurate dial indications of the pitch and roll of an airplane during flight. For simplicity, separate dials are shown, but it will be understood that indicating devices for both tubes may be arranged on one dial, so that both pitch and roll are shown by one instrument. In this use of my tubes, one of them is disposed with the grid frame pivotal axis on or parallel to the longitudinal axis of the airplane; and the other tube is disposed with the pivotal axis at right angles to such longitudinal axis. In each, the pivotal axis must lie in a horizontal plane when the airplane is in the position of level flight.

With the plane in the position it will assume in level flight, the tubes are placed and the circuits adjusted to give a zero reading on each dial 51 and 52. With the start of a flight, the mere closing of the switch 53 puts the system in operation. The first tube 54 is sensitive to any turning of the plane about its longitudinal axis, that is, to roll; and variation in the arc of coincidence between the electrodes of that tube is immediately evaluated on the dial 51 in degrees of rolling movement. The second tube 56 is sensitive to turning of the plane about its lateral axis, that is, to pitch; and variation in the arc of coincidence between the electrode of the second tube is instantly evaluated in degrees on the dial 52. As in the single tube, relay-operated switches in control circuits may be utilized to provide automatically operating means of known character for the control of flight.

I claim:

1. An electron discharge device comprising a chassis, a grid frame pivoted in the chassis, a grid mounted on the grid frame in an arc centered at the axis of the grid frame pivot, and an anode and a cathode supported on the chassis and lying at the side of the grid in arcs centered at the axis of the grid frame pivot.

2. An electron discharge device comprising a chassis, a grid and supporting frame therefor pivotally balanced on the chassis and mounting the grid for movement in an arc centered at the pivotal axis of the grid, and an anode and a cathode supported on the chassis and lying adjacent the grid in arcs centered at the axis of the grid pivot.

3. An electron discharge device comprising a chassis, a grid frame pivoted in the chassis, a grid mounted on the grid frame in an arc centered at the axis of the grid frame pivot, counterbalancing means on the grid frame, and an anode and a cathode supported on the chassis and lying at the side of the grid in arcs centered at the axis of the grid frame pivot.

4. An electron discharge device comprising a chassis, a grid and supporting frame therefor including a counterbalancing vane and pivotally balanced on the chassis and mounting the grid for movement in an arc centered at the pivotal axis of the grid, an anode and a cathode supported on the chassis and lying adjacent the grid in arcs centered at the axis of the grid pivot, and magnetic means fixed on the chassis on each side of the vane for damping vibratory movements in the grid supporting frame.

5. An electron discharge device comprising a chassis, a grid and supporting frame therefor pivotally balanced on the chassis and mounting the grid for movement in an arc centered at the pivotal axis of the grid, an anode and a cathode supported on the chassis and lying adjacent the grid in arcs centered at the axis of the grid pivot, and means mounted on the chassis for causing a magnetic flux adjacent a part of the grid supporting frame.

6. An electron discharge device comprising a chassis, a grid and supporting frame therefor pivotally balanced on the chassis and mounting the grid for movement in an arc centered at the pivotal axis of the grid, an anode and a cathode supported on the chassis and lying adjacent the grid in arcs centered at the axis of the grid pivot, and a magnet mounted on the chassis adjacent a portion of the grid supporting frame.

7. An electron discharge device comprising a chassis, a grid and supporting frame therefor pivotally balanced on the chassis and mounting the grid for movement in an arc centered at the pivotal axis of the grid, an anode and a cathode supported on the chassis and lying adjacent the grid in arcs centered at the axis of the grid pivot, an envelope surrounding the chassis, and electric conductors connecting the grid, cathode and anode to individual terminals therefor.

8. An electron discharge device comprising a chassis, a grid and supporting frame therefor including a counterbalancing vane and pivotally balanced on the chassis and mounting the grid for movement in an arc centered at the pivotal axis of the grid, an anode and a cathode supported on the chassis and lying adjacent the grid in arcs centered at the axis of the grid pivot, a magnet fixed on the chassis adjacent the grid frame vane, an envelope enclosing the device, external leads on said envelope, and means electrically connecting said leads to the grid and anode and cathode.

9. An electron discharge device comprising a chassis, a grid and supporting frame therefor including a counterbalancing vane and pivotally balanced on the chassis and mounting the grid for movement in an arc centered at the pivotal axis of the grid, an anode and a cathode supported on the chassis and lying adjacent the grid in arcs centered at the axis of the grid pivot, a magnet fixed on the chassis adjacent the grid frame vane, an envelope enclosing the device, external leads on said envelope, and means electrically connecting said leads to the grid and anode and cathode, said last named means connected to the grid being a spring for resisting in slight degree relative movement of the grid about its pivot.

WILLIAM C. MARSHALL.

REFERENCES CITED

The following references are of record in the file of this patent:

UNITED STATES PATENTS

| Number | Name | Date |
|---|---|---|
| 1,309,753 | DeForest | July 15, 1919 |
| 1,548,095 | Osborne | Aug. 4, 1925 |
| 1,569,684 | Schwerin | Jan. 12, 1926 |
| 1,610,316 | Quilter | Dec. 14, 1926 |
| 1,864,214 | Petty | June 21, 1932 |
| 1,997,986 | Thomas | Apr. 16, 1935 |
| 2,068,775 | Stettler | Jan. 26, 1937 |
| 2,167,519 | Manthorne | July 25, 1939 |
| 2,179,673 | Smith | Nov. 14, 1939 |
| 2,225,032 | Carbonara | Dec. 17, 1940 |
| 2,288,812 | Linder | July 7, 1942 |
| 2,348,177 | Keeler | May 2, 1944 |
| 2,392,370 | Esval et al. | Jan. 8, 1946 |

FOREIGN PATENTS

| Number | Country | Date |
|---|---|---|
| 847,452 | France | July 3, 1939 |